(12) United States Patent
Chen et al.

(10) Patent No.: US 10,352,287 B2
(45) Date of Patent: Jul. 16, 2019

(54) CONTROLLING ENGINE OF VEHICLE

(71) Applicant: Beijing Xiaomi Mobile Software Co., Ltd., Haidian District, Beijing (CN)

(72) Inventors: Tao Chen, Beijing (CN); Mingyong Tang, Beijing (CN); Huayijun Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/686,907

(22) Filed: Aug. 25, 2017

(65) Prior Publication Data

US 2018/0058408 A1 Mar. 1, 2018

(30) Foreign Application Priority Data

Aug. 31, 2016 (CN) .......................... 2016 1 0792508

(51) Int. Cl.
| | | |
|---|---|---|
| *B60G 17/019* | (2006.01) | |
| *F02N 11/08* | (2006.01) | |
| *B60R 16/023* | (2006.01) | |
| *G01F 23/24* | (2006.01) | |

(Continued)

(52) U.S. Cl.
CPC ...... *F02N 11/0837* (2013.01); *B60R 16/0231* (2013.01); *F02N 11/101* (2013.01); *G01F 23/241* (2013.01); *B60G 17/019* (2013.01); *B60G 17/0165* (2013.01); *B60G 2300/07* (2013.01); *F02N 2200/12* (2013.01); *Y02T 10/48* (2013.01)

(58) Field of Classification Search
CPC ............... F02N 11/0837; F02N 11/101; B60R 16/0231; G01F 23/241; B60G 17/0165; B60G 17/019; B60G 2300/07; B60W 2550/12; B60W 2550/13; B60W 2550/14; F02D 2200/702; F02D 2200/70
USPC ........... 123/179.3, 179.4; 701/107, 112, 113; 73/114.12
See application file for complete search history.

(56) References Cited

U.S. PATENT DOCUMENTS

| | | | |
|---|---|---|---|
| 8,688,360 B2 * | 4/2014 | Norden ................. | F01N 11/002 180/65.1 |
| 2005/0045134 A1 | 3/2005 | Amanuma et al. | |
| 2014/0102409 A1 | 4/2014 | Rangger et al. | |

(Continued)

FOREIGN PATENT DOCUMENTS

| | | |
|---|---|---|
| CN | 103112422 A | 5/2013 |
| CN | 103562692 A | 2/2014 |

(Continued)

OTHER PUBLICATIONS

John B. Heyweed, "Internal Combustion Engine Fundamentals", 1988, McGraw-Hill, 16 and 17.*

(Continued)

*Primary Examiner* — Hai H Huynh
*Assistant Examiner* — Gonzalo Laguarda
(74) *Attorney, Agent, or Firm* — Arch & Lake LLP

(57) ABSTRACT

The present disclosure relates to controlling engine of a vehicle. According to an aspect of the present disclosure, when it is determined that the vehicle has entered a deep water area, an engine start-stop function of the vehicle is disabled. The deep water area has a water depth which allows water to enter the engine of the vehicle or causes the engine of the vehicle to be susceptible to water inflow.

13 Claims, 7 Drawing Sheets

(51) Int. Cl.
*F02N 11/10* (2006.01)
*B60G 17/0165* (2006.01)

(56) References Cited

U.S. PATENT DOCUMENTS

| | | |
|---|---|---|
| 2014/0257678 A1 | 9/2014 | Boesch et al. |
| 2015/0046032 A1 | 2/2015 | Clarke et al. |

FOREIGN PATENT DOCUMENTS

| | | |
|---|---|---|
| CN | 104380060 A | 2/2015 |
| CN | 104401248 A | 3/2015 |
| CN | 104791113 A | 7/2015 |
| CN | 104986105 A | 10/2015 |
| DE | 102008042016 A1 | 3/2010 |
| DE | 102014203987 A1 | 9/2014 |
| WO | 2012171049 A1 | 12/2012 |
| WO | 2015049154 A1 | 4/2015 |

OTHER PUBLICATIONS

First Office Action issued in corresponding Chinese Patent Application No. 201610792508.9, dated Sep. 9, 2017, 5 pages.
Extended European Search Report issued in corresponding European Application No. 17188712.8, dated May 18, 2018, 7 pages.

\* cited by examiner

CONTROLLING ENGINE OF VEHICLE

CROSS REFERENCE TO RELATED APPLICATIONS

The present disclosure is based on and claims priority to Chinese Patent Application No. 201610792508.9, filed on Aug. 31, 2016, the entire contents of which are incorporated herein by reference.

TECHNICAL FIELD

The present disclosure relates to controlling engine of a vehicle.

BACKGROUND

Generally, most modern automobiles are equipped with engine start-stop functions. The so-called engine start-stop function may refer to function of a vehicle that controls an engine to automatically flame out in case of a temporary stop (for example, a stop at a red light) in driving process of the vehicle and to automatically start when the vehicle is to move on. The start-stop function may be implemented by a circuitry such as a chip.

Specifically, a driver may step on a brake pedal to brake when a temporary stop is needed during driving, and the engine may be controlled to automatically flame out in about two seconds after the vehicle stops completely. In this process, the driver may keep stepping on the brake pedal. Once the driver releases the brake pedal or turns the steering wheel, the engine may be controlled to automatically get started. At this moment, the driver may step on the accelerator to start, where in the entire process the vehicle is in Drive (namely, forward gear) state.

However, when the vehicle passes through an area where water is deep, automatically starting the engine may cause water to enter the engine, which may severely damage the engine.

SUMMARY

To solve the problem that automatically starting an engine easily causes water to flow into the engine, examples of the present disclosure provide a method and apparatus of controlling engine of a vehicle, and a vehicle.

According to a first aspect of the examples of the present disclosure, a method of controlling engine is provided. The method may include: determining, by a processor, whether a vehicle has entered a deep water area, wherein a deep water area has a water depth which allows water to enter an engine of the vehicle or causes the engine of the vehicle to be susceptible to water inflow; and disabling an engine start-stop function of the vehicle when the processor determines that the vehicle has entered the deep water area.

According to a second aspect of the examples of the present disclosure, an apparatus for controlling engine is provided, which may include a processor and a machine-readable storage medium, wherein by reading and executing machine-executable instructions corresponding to engine controlling logic stored in the machine-readable storage medium, the processor may be caused to: determine whether a vehicle has entered a deep water area, wherein a deep water area has a water depth which allows water to enter an engine of the vehicle or causes the engine of the vehicle to be susceptible to water inflow; and disable an engine start-stop function of the vehicle when the processor determines that the vehicle has entered a deep water area.

According to a third aspect of the examples of the present disclosure, a machine-readable storage medium may be provided, which may store machine-executable instructions executed by one or more processors, wherein the machine-executable instructions may cause the processor to:
determine whether a vehicle has entered a deep water area, wherein a deep water area has a water depth which allows water to enter an engine of the vehicle or causes the engine of the vehicle to be susceptible to water inflow; and
disable an engine start-stop function when the processor determines that the vehicle has entered a deep water area.

According to a fourth aspect of the examples of the present disclosure, a vehicle is provided, which may include the apparatus according to the second aspect.

It is to be understood that both the foregoing general description and the following detailed description are exemplary and explanatory only and are not restrictive of the present disclosure.

BRIEF DESCRIPTION OF DRAWINGS

To describe the examples of the present disclosure more clearly, the accompanying drawings required for describing the examples will be described below. Apparently, the accompanying drawings in the following description show merely some examples of the present disclosure, and persons of ordinary skill in the art may still derive other drawings from these accompanying drawings without creative efforts.

Figure 1:
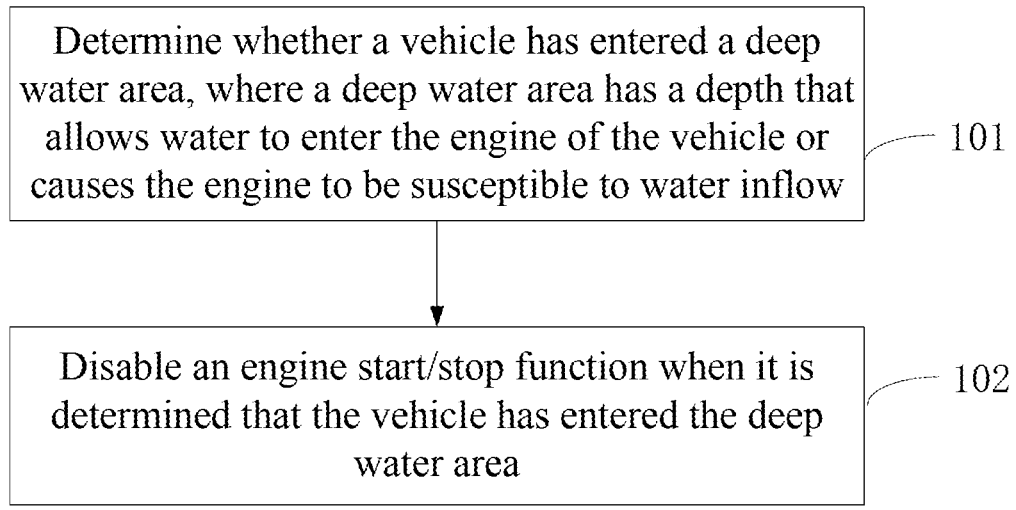
FIG. 1 is a flowchart of a method of controlling engine according to an example.

The accompanying drawings, which are incorporated in and constitute a part of this specification, illustrate examples consistent with the present disclosure and, together with the description, serve to explain the principles of the present disclosure.

DETAILED DESCRIPTION

Detailed description of the present disclosure will further be made with reference to drawings in order to make the above objects, technical solutions and advantages of the present disclosure more apparent.

The engine start-stop function may be automatically disabled when it is determined that the vehicle has entered the deep water area, so that the engine may be prevented from being automatically started, which may prevent water from flowing into the engine, thereby avoiding damage to the engine.

In some examples, determining whether the vehicle has entered a deep water area may include: determining, by the processor, whether the vehicle has entered a deep water area according to a detection result of a water detection sensor, where the water detection sensor is arranged at a preset position of the vehicle, and water may enter the engine from the preset position when the engine is running.

It may be accurately determined whether the vehicle has entered a deep water area by using the water detection sensor.

In some examples, determining whether the vehicle has entered a deep water area according to a detection result of the water detection sensor may include: receiving, by the processor, an alarm signal generated by the water detection sensor when the water detection sensor detects water; recording, by the processor, duration of the alarm signal; and determining, by the processor, that the vehicle has entered a deep water area when the duration of the alarm signal is greater than or equal to a preset duration threshold.

In some examples, determining whether the vehicle has entered a deep water area according to a detection result of the water detection sensor may include: recording, by the processor, the number of the water detection sensors generating alarm signals arranged at different positions; and determining, by the processor, that the vehicle has entered a deep water area when the number of the water detection sensors generating alarm signals is greater than or equal to a preset number threshold.

In some examples, the method may further include: determining, by the processor, whether the vehicle has moved out of the deep water area after the engine start-stop function is disabled; and enabling, by the processor, the engine start-stop function when the processor determines that the vehicle has moved out of the deep water area. Alternatively or additionally, the method may include: determining, by the processor, whether the water has moved out of the engine after the engine start-stop function is disabled.

In some examples, the water detection sensor may include a water immersion sensor.

In some examples, the preset position may comprise at least one of an exhaust and a chassis of the vehicle.

In some examples, the processor is an electronic controller of the vehicle.

In some examples, when determining whether the vehicle has entered a deep water area, the machine-executable instructions may cause the processor to determine whether the vehicle has entered a deep water area according to a detection result of the water detection sensor.

The water detection sensor may be arranged at a preset position of the vehicle, and water may enter the engine from the preset position when the engine is running.

In some examples, when determining whether the vehicle has entered a deep water area according to the detection result of the water detection sensor, the machine-executable instructions may cause the processor to: receive an alarm signal generated by the water detection sensor when the water detection sensor detects water; record a duration of the alarm signal; and determine that the vehicle has entered a deep water area when the duration of the alarm signal is greater than or equal to a preset duration threshold.

In some examples, there may be a plurality of water detection sensors, which may be arranged at different positions.

When determining that the vehicle has entered the deep water area according to the detection result of the water detection sensor, the machine-executable instructions may cause the processor to: evaluate the number of the water detection sensors generating alarm signals arranged at different positions; and determine that the vehicle has entered a deep water area when the number of the water detection sensors generating alarm signals is greater than or equal to a preset number threshold.

In some examples, the machine-executable instructions may further cause the processor to: determine whether the vehicle has moved out of the deep water area after the engine start-stop function is disabled; and enable the engine start-stop function when the processor determines that the vehicle has moved out of the deep water area.

In some examples, the water detection sensor may include a water immersion sensor.

In some examples, the preset position may comprise at least one of an exhaust and a chassis of the vehicle.

Technical solutions provided by the examples of the present disclosure may include the following beneficial effects. According to the examples of the present disclosure, the engine start-stop function may be automatically disabled when it is determined that the vehicle has entered a deep water area, so that the case of water flowing into the engine caused by automatically starting the engine may be avoided. The control process may be automatically completed by the vehicle, so that operation of a driver may be reduced, and thus the driving experience of the driver may be effectively improved.

FIG. 1 is a flowchart of a method of controlling engine according to an example. The method may be applied to a vehicle, and the method may include the following blocks.

At Block 101, it is determined whether a vehicle has entered a deep water area, where a deep water area has a water depth which allows water to enter an engine or causes the engine to be susceptible to water inflow. For example, a processor in the vehicle may determine whether there is a risk of water damage to the engine using collected data from one or more sensors.

In a practical application, the vehicle may be provided with a processing module and a sensor for detecting water. The processing module may be connected with the sensor and determine whether the vehicle has entered a deep water area according to a detection result of the sensor.

The processing module may be a central processing unit (CPU), a microcontroller unit (MCU), a processor, or an electronic controller, etc. The electronic controller may read data of the vehicle. The sensor may be a water detection sensor. For example, the water detection sensor may be a water immersion sensor or a photoelectric water immersion sensor.

It is to be noted that the water immersion sensor may utilize an electrode to detect whether water exists based on a principle that a liquid may conduct electricity, and then utilize the sensor to convert water immersion into a dry contact output. Generally, the water immersion sensor may include a bipolar probe. The bipolar probe may be insulated by air under normal circumstances, and may be conductive in a water immersion state whereupon the sensor may output a dry contact signal. An alarm signal may be generated when a water immersion height of the probe exceeds a threshold, where the threshold of the water immersion height may be 1 mm.

In the examples of the present disclosure, a deep water area may be an area directly causing water to flow into the engine or an area causing the engine to be susceptible to water inflow. For example, when the vehicle runs over a road where accumulated water exists, the accumulated water may submerge or get close to an exhaust (namely, an exhaust shroud) of the vehicle. In this case, it may be considered that the vehicle has entered a deep water area.

At Block 102, an engine start-stop function may be disabled when it is determined that the vehicle has entered a deep water area. For example, the processor may disable the circuitry providing the engine start-stop function by disconnecting power supply to the circuitry. When there are a plurality of engines installed in the vehicle, the processor may disable one of the engines that is most likely to be affected by the water.

According to an example, a communication connection may be established between the processing module and a control module controlling the engine start-stop function. The communication connection may be a signal line connection or an in-vehicle network connection. When the processing module determines that the vehicle has entered a deep water area, a control signal may be sent to the control module controlling the engine start-stop function to control the engine start-stop function to be disabled. It is to be noted that the processing module and the control module may be two discrete modules or may be integrated together, which is not limited in the examples of the present disclosure.

Alternatively or additionally, a communication connection may be established between the processing module and the engine. The communication connection may be a signal line connection or an in-vehicle network connection. When the processing module determines that the vehicle has entered a deep water area, a control signal may be sent to the engine to control the engine to be shut down, and correspondingly the engine start-stop function may be disabled.

In short, according to the method provided in the examples of the present disclosure, the engine start-stop function may be automatically disabled when it is determined that the vehicle has entered a deep water area, so that a case of damaging the engine due to water flowing into the engine caused by automatically starting the engine may be avoided. The control process may be automatically completed by the vehicle, so that operation of a driver may be reduced, and thus the driving experience of the driver may be effectively improved.

Figure 2A:
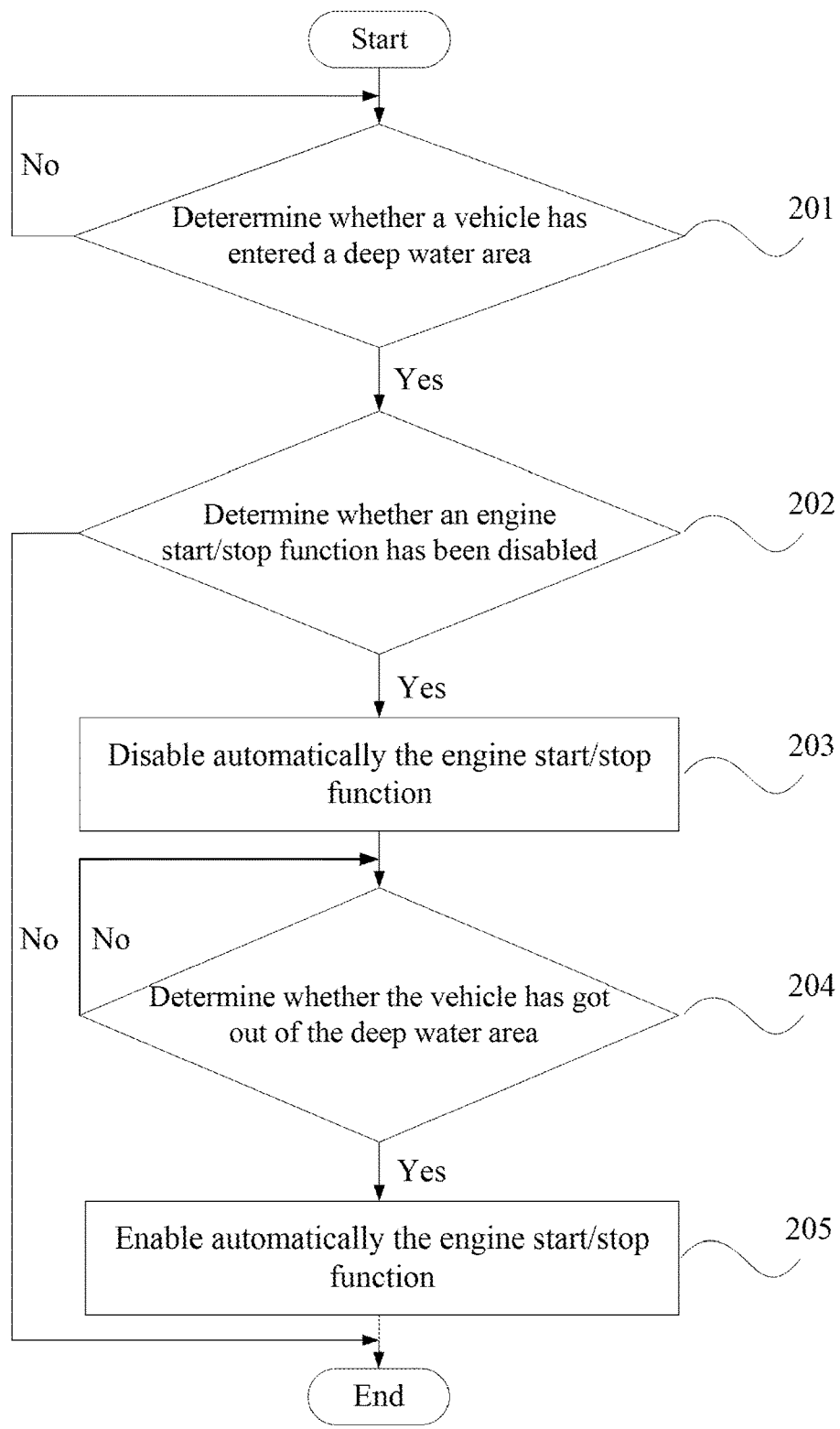
FIG. 2A is a flowchart of another method of controlling engine according to an example.

FIG. 2A is a flowchart of another method of controlling engine according to an example. The method may be applied to a vehicle, and the method may include the following blocks.

At Block 201, it is determined whether the vehicle has entered a deep water area. Block 202 may be executed when it is determined that the vehicle has entered a deep water area. Block 201 may be repeatedly executed when it is not determined that the vehicle has entered a deep water area.

In the examples of the present disclosure, a deep water area may have a water depth which allows water to enter the engine or causes the engine to be susceptible to water inflow. In a practical application, a preset position of the vehicle is provided with a water detection sensor. When the engine is running, water may enter the engine from the preset position. For example, the preset position may comprise at least one of an exhaust and a chassis of the vehicle. This is because restarting the stalled engine when the vehicle is in a deep water area may cause water to be drawn into the engine from the exhaust of the vehicle, which may severely damage the engine.

In the examples of the present disclosure, determining whether a vehicle has entered a deep water area may include: determining whether the vehicle has entered a deep water area according to a detection result of the water detection sensor.

There may be a plurality of implementations for determining whether the vehicle has entered a deep water area according to the detection result of the water detection sensor. In the examples of the present disclosure, references may be made by taking the following two implementations as examples.

Figure 2B:
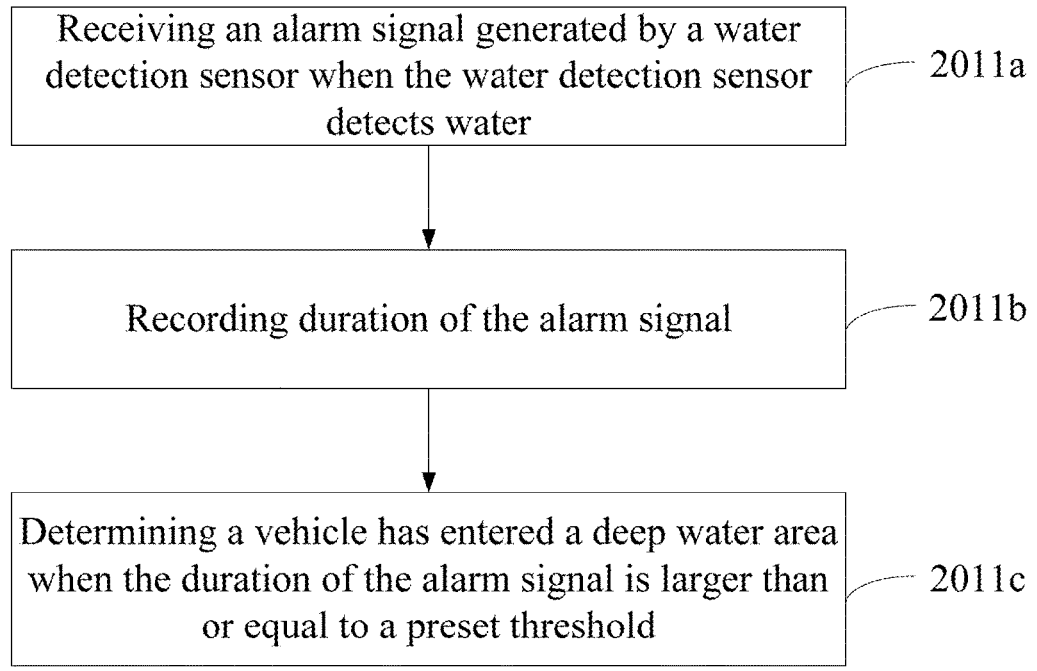
FIG. 2B is a flowchart of a method of determining whether a vehicle has entered a deep water area according to a detection result of a water detection sensor according to an example.

Reference may be made to FIG. 2B for the first implementation, where FIG. 2B is a flowchart of a method for determining whether a vehicle has entered a deep water area according to a detection result of a water detection sensor according to an example, and the method may include the following blocks.

At Block 2011a, an alarm signal generated by the water detection sensor may be received when the water detection sensor detects water.

The water detection sensor may be a water immersion sensor or a photoelectric water immersion sensor. Reference may be made to the above description and sensor technologies well known to those skilled in the art for the working principle of the water detection sensor, which will not be described in the examples of the present disclosure.

At Block 2012a, duration of the alarm signal may be recorded.

For example, the processor may start a timer when the alarm signal is received for the first time, and stop the timer when the alarm signal ends. The difference between the stop time and the start time of the alarm signal may be deemed as the duration of the alarm signal.

In a practical application, duration of the alarm signal may be recorded in real time. For example, when the alarm signal still continues at a current moment, a difference between the current time and a start time of the alarm signal may be regarded as the duration of the alarm signal.

At Block 2013a, it may be determined that the vehicle has entered a deep water area when the duration of the alarm signal is greater than or equal to a preset duration threshold.

In a first aspect, the vehicle may be provided with a processing module. For example, the processing module may be an electronic controller and may read data of the vehicle. The water detection sensor may be connected with the electronic controller via a circuit, and the duration of the alarm signal generated by the water detection sensor may be sent to the electronic controller. The electronic controller may pre-store a preset duration threshold. The electronic controller may determine that the vehicle has entered a deep water area when the duration of the alarm signal is greater than or equal to the preset duration threshold. Otherwise, it may be continuously detected whether the vehicle has entered a deep water area.

In the second aspect, there may be a plurality of water detection sensors in total, and different sensors may be arranged at different parts of the vehicle. For example, N sensors may be arranged at preset positions. According to the examples of the present disclosure, when the engine is running, water may enter the engine from the preset positions. Alternatively, a preset height difference threshold may exist between the preset position and a part of the vehicle that is prone to causing water to flow into the engine. For example, water is prone to flowing into the engine when water enters an exhaust pipe of the vehicle. Therefore, the sensor may be directly arranged in an exhaust shroud, so that the engine start-stop function may be timely disabled in case that the exhaust pipe is immersed in water. Alternatively, the sensor also may be arranged beneath the exhaust shroud, so that the engine start-stop function may be disabled when water has not entered the exhaust pipe on a road surface where accumulated water is deep, thereby reducing a risk of water flowing into the engine.

The height difference threshold may be preset according to different vehicle types and sensor types, etc. For example, the height difference threshold may be set to 2 cm.

Figure 2C:
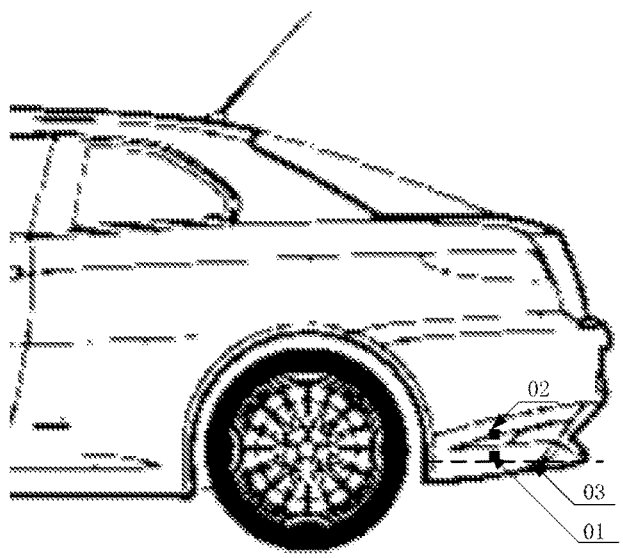
FIG. 2C is a schematic diagram of preset positions of water detection sensors according to an example.

The above N water detection sensors may be set at different heights. For example, the N water detection sensors may include a first sensor and a second sensor. Referring to FIG. 2C, which is a schematic diagram of preset positions of water detection sensors according to an example. The first sensor 01 may be arranged in an exhaust 03 of the vehicle, and the second sensor 02 may be arranged a few centimeters above the exhaust 03 of the vehicle. For example, the second sensor may be arranged 2 cm above the exhaust 03 of the vehicle. A plurality of sensors may be arranged at different parts and different heights, particularly for bumpy road, so that water immersion may be effectively detected in time.

Figure 2D:
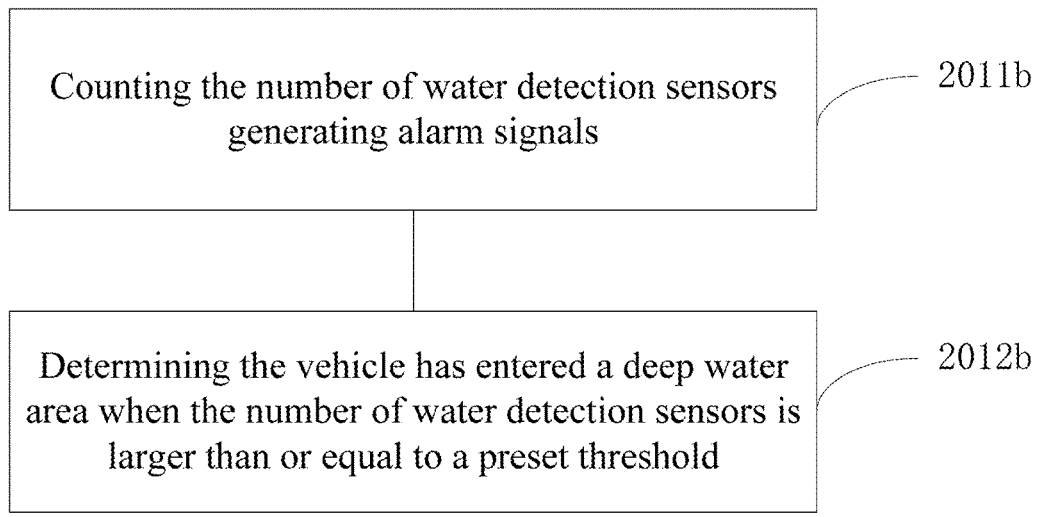
FIG. 2D is a flowchart of another method of determining whether a vehicle has entered a deep water area according to a detection result of a water detection sensor according to an example.

Referring to FIG. 2D, which is a flowchart of another method for determining whether a vehicle has entered a deep water area according to a detection result of a water detection sensor according to an example, the method may include the following blocks.

At Block 2011b, the number of the water detection sensors generating alarm signals may be evaluated. For example, the number may be counted using a counter circuit.

For example, three water detection sensors may be arranged at different positions of the vehicle. Each water detection sensor may generate an alarm signal when it detects water. At this moment, the number of the sensors generating alarm signals among the three sensors may be detected. In a practical application, the water detection sensors may be identified by means of sensor identifier carried in the alarm signal, where each sensor identifier may be uniquely associated with one water detection sensor. For example, when the vehicle receives three alarm signals, and the three alarm signals carry two different sensor identifications (that is, one of the water detection sensors generates two alarm signals, and the other water detection sensor generates one alarm signal), it may be determined that the number of the water detection sensors generating the alarm signals is two.

At Block 2012b, it may be determined that the vehicle has entered a deep water area when the number of the water detection sensors generating alarm signals is greater than or equal to a preset number threshold.

For example, in case that three water detection sensors are arranged and the preset number threshold is two, it may be determined that the vehicle has entered a deep water area when it is determined that the number of the water detection sensors generating the alarm signals is greater than or equal to two.

According to the examples of the present disclosure, the vehicle may be provided with a processing module. For example, the processing module may be an electronic controller or other hardware processor, the N water detection sensors may be connected with the electronic controller via a circuit, and the number of the alarm signals generated by the water detection sensors may be sent to the electronic controller. The electronic controller may store a preset number threshold. The electronic controller may determine that the vehicle has entered a deep water area when the number of the water detection sensors generating the alarm signals is greater than or equal to the preset number threshold. Otherwise, it may be continuously determined whether the vehicle has entered a deep water area.

At Block 202, it may be determined whether an engine start-stop function is enabled. Block 203 may be executed when it is determined that the engine start-stop function is enabled. The block may be ended when it is determined that the engine start-stop function is disabled.

In the disclosure, the engine start-stop function may be manually enabled or disabled by the driver in advance. After the engine start-stop function is disabled, the problem of water entering the engine when the vehicle is in a deep water area may not occur. Therefore, it may be unnecessary to execute the block of disabling the engine start-stop function. Therefore, in this example, it may be determined in advance whether the engine start-stop function is enabled.

At Block 203, the engine start-stop function may be automatically disabled.

Because the engine start-stop function may be manually disabled or enabled by the driver, to further determine whether the engine start-stop function is enabled, data of the vehicle may be read by means of the processing module such as the electronic controller. When the read data indicate that the engine start-stop function is disabled, the block may be ended. Otherwise, at Block 203, the processing module may automatically disable the engine start-stop function.

At Block 204, it may be determined whether the vehicle has moved out of the deep water area. Block 205 may be executed when it is determined that the vehicle has moved out of the deep water area. Block 204 may be repeatedly executed when it is not determined that the vehicle has moved out of the deep water area.

After the vehicle has entered a deep water area and has been driving for a period of time, the vehicle might have moved out of the deep water area. Therefore, after the engine start-stop function is disabled, it may be determined whether the vehicle has moved out of the deep water area. The engine start-stop function may be automatically re-enabled when it is determined that the vehicle has moved out of the deep water area.

In a practical application, when the water detection sensor does not continuously send alarm signals to the processing module within a preset period of time, the processing module may determine that the vehicle has moved out of the deep water area, and then Block 205 may be executed. Otherwise, it may be continuously determined whether the vehicle has moved out of the deep water area.

At Block 205, the engine start-stop function may be automatically enabled.

It is to be noted that the sequential orders of the blocks of the method provided by the examples of the present disclosure may be appropriately adjusted, and the number of blocks may be correspondingly increased or decreased as the circumstances may require, for example, Block 202 may be deleted. Actually, any variation of the method easily conceivable to a person of ordinary skills in the art within the technical scope disclosed in the present disclosure shall fall into the protection scope of the present disclosure.

In conclusion, according to the method provided by the examples of the present disclosure, the engine start-stop function may be automatically disabled when it is determined that the vehicle has entered a deep water area, so that the case of damaging the engine due to water flowing into the engine caused by automatically starting the engine may be avoided. The control process may be automatically completed by the vehicle, so that operation of a driver may be reduced, and thus the driving experience of the driver may be effectively improved.

Figure 3A:
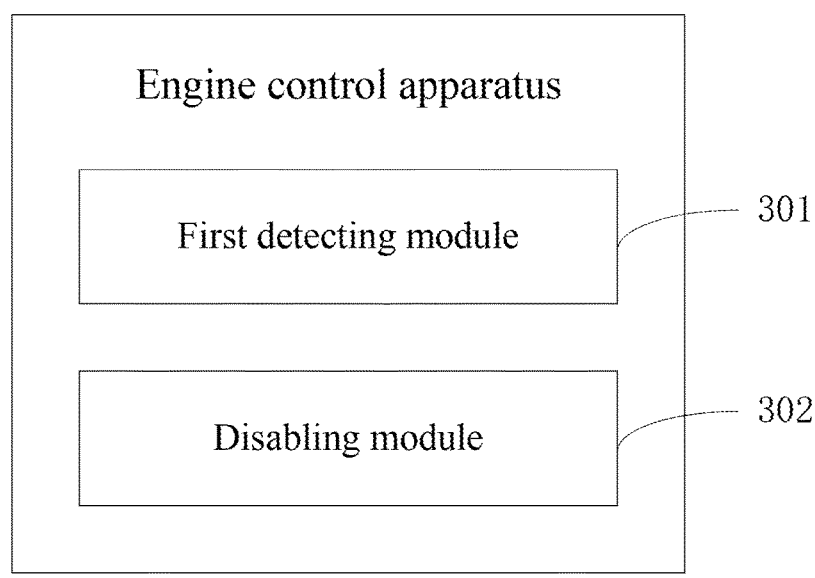
FIG. 3A is a block diagram of engine controlling logic according to an example.

FIG. 3A is a block diagram of engine controlling logic according to an example. As shown in FIG. 3A, the engine controlling logic may include the following modules:

a first detection module 301, configured to detect whether a vehicle has entered a deep water area, where a deep water area has a water depth which allows water to enter an engine or causes the engine to be susceptible to water inflow; and a disabling module 302, configured to disable an engine start-stop function when it is determined that the vehicle has entered the deep water area.

In conclusion, according to the engine controlling logic provided by the examples of the present disclosure, the disabling module 302 may be caused to automatically disable the engine start-stop function when the first detection module 301 detects that the vehicle has entered a deep water area, so that the case of damaging the engine due to water flowing into the engine caused by automatically starting the engine may be avoided. The control process may be automatically completed, so that operation may be reduced for a driver, and thus the driving experience of the driver may be effectively improved.

Figure 3B:
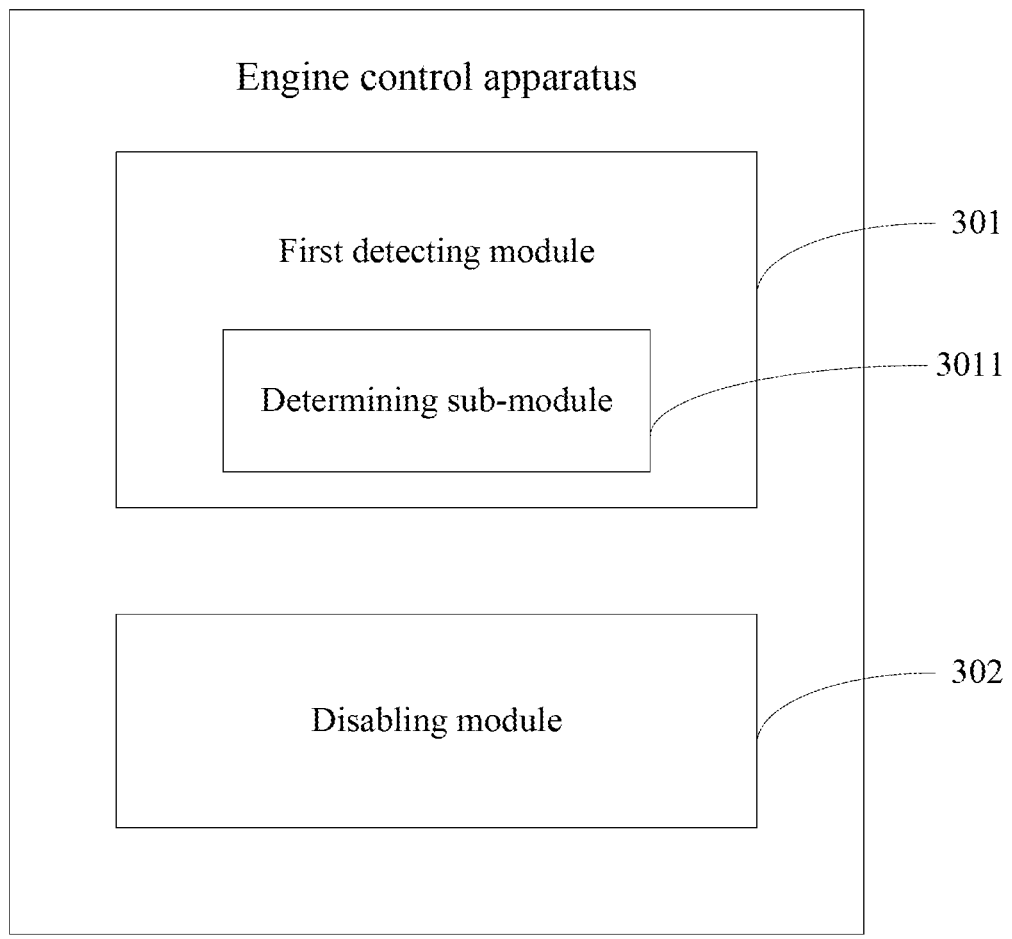
FIG. 3B is a block diagram of engine controlling logic according to another example.

FIG. 3B is a block diagram of engine controlling logic according to an example. As shown in FIG. 3B, the engine controlling logic may include the following modules:

a first detection module 301, configured to detect whether a vehicle has entered a deep water area, where a deep water area has a water depth which allows water to enter an engine or causes the engine to be susceptible to water inflow; and a disabling module 302, configured to disable an engine start-stop function when it is determined that the vehicle has entered a deep water area. The engine start-stop function may refer to the function that a vehicle may automatically start the engine when the vehicle temporarily stops in a driving process.

In case that the preset position of the vehicle is provided with a water detection sensor, the first detection module 301 may specifically include a determining submodule 3011. When the engine is running, water may enter the engine from the pre-set position. The determining submodule 3011 may be configured to determine whether the vehicle has entered a deep water area according to a detection result of the water detection sensor.

For example, the determining submodule 3011 may be configured to receive an alarm signal generated by the water detection sensor when the water detection sensor detects water; record a duration of the alarm signal; and determine that the vehicle has entered a deep water area when the duration of the alarm signal is greater than or equal to a preset duration threshold.

Alternatively, in case that there may be a plurality of water detection sensors and the plurality of the water detection sensors may be arranged at different positions, the determining submodule 3011 may be configured to count the number of the water detection sensors generating alarm signals, and determine that the vehicle has entered a deep water area when the number of the water detection sensors generating alarm signals is greater than or equal to a preset number threshold.

Figure 3C:
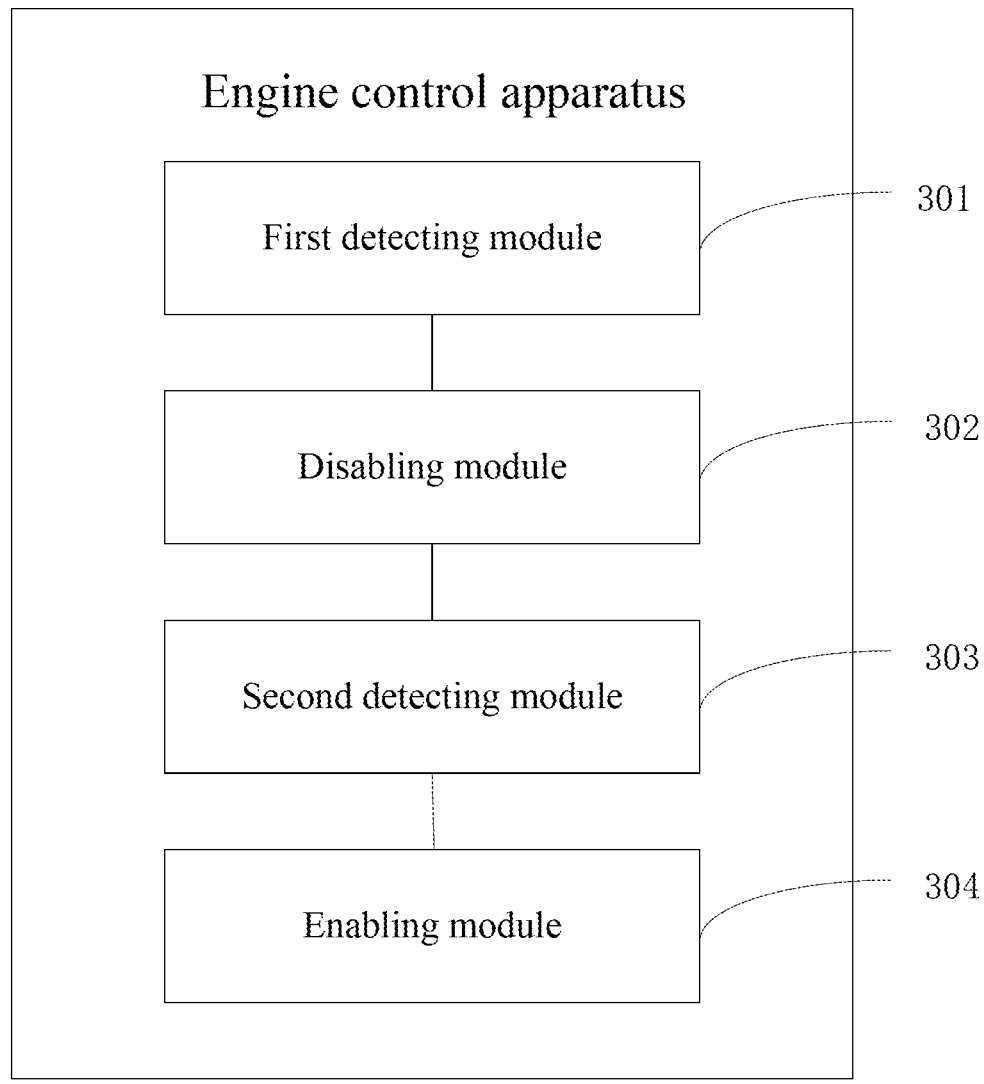
FIG. 3C is a block diagram of engine controlling logic according to still another example.

FIG. 3C is another block diagram of engine controlling logic of engine according to an example. As shown in FIG. 3C, the engine controlling logic may include the following modules:

a first detection module 301, configured to detect whether a vehicle has entered a deep water area, where a deep water area has a water depth which allows water to enter an engine or causes the engine to be susceptible to water inflow;

a disabling module 302, configured to disable an engine start-stop function when it is determined that the vehicle has entered a deep water area;

a second detection module 303, configured to detect whether the vehicle has moved out of the deep water area; and an enabling module 304, configured to enable the engine start-stop function when it is determined that the vehicle has moved out of the deep water area.

In some examples, the water detection sensor may include a water immersion sensor.

In some examples, the preset position may comprise at least one of an exhaust and a chassis of the vehicle.

It is to be noted that the preset position may include but not be limited to the exhaust or the chassis, and any part of the vehicle subject to water immersion that may cause water to enter the engine when running may fall within the scope of protection of the present disclosure.

Persons skilled in the art may clearly understand that for a convenient and concise description, a concrete work process of the apparatuses and modules described above may refer to a corresponding process of the foregoing method examples, which is not repeated herein.

In conclusion, according to the engine controlling logic provided by the examples of the present disclosure, the engine start-stop function may be automatically disabled when the first detection module detects that the vehicle has entered a deep water area, so that the case of damaging the engine due to water flowing into the engine caused by automatically starting the engine may be avoided. The control process may be automatically completed, so that operation may be reduced for a driver, and thus the driving experience of the driver may be effectively improved.

Figure 4:
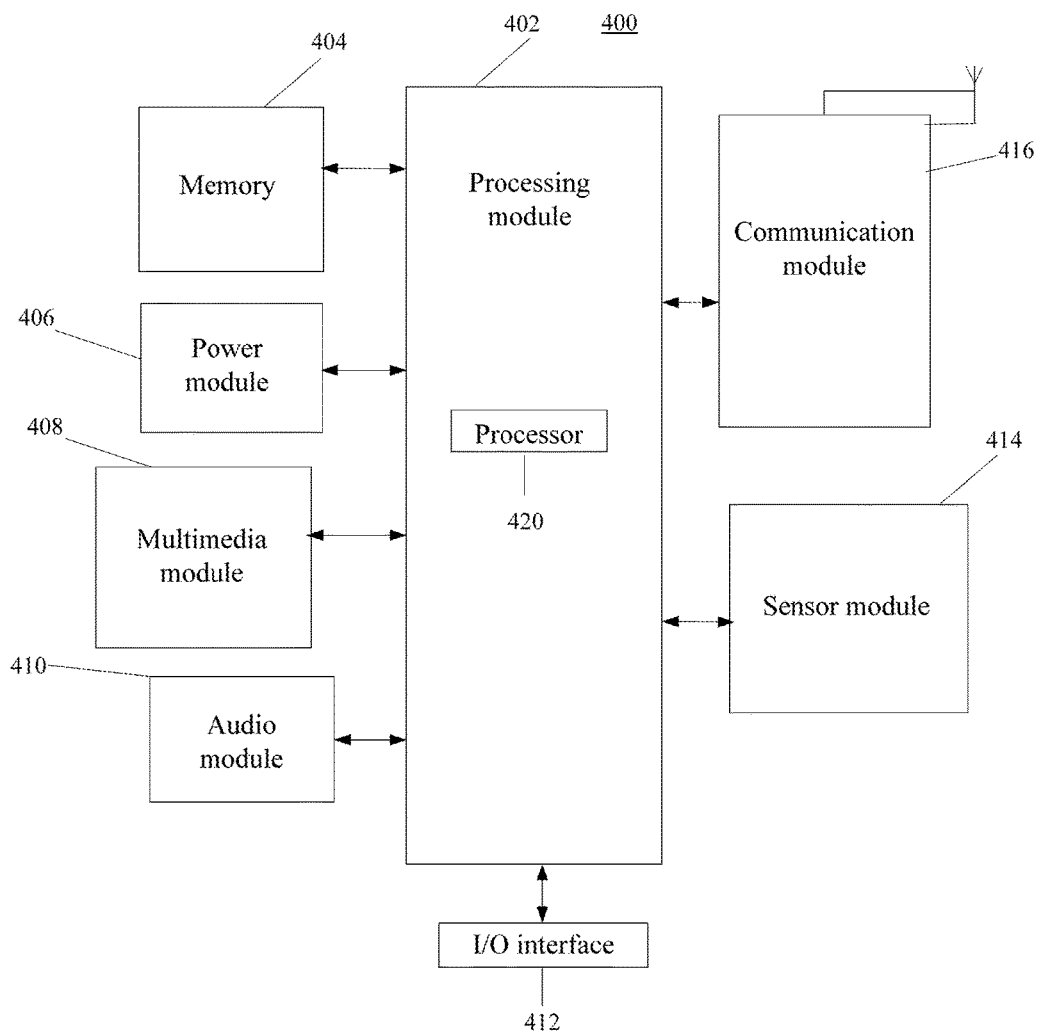
FIG. 4 is a block diagram of an apparatus for controlling engine according to an example.

FIG. 4 is a block diagram of an apparatus 400 for controlling engine according to an example. For example, the apparatus 400 may be a vehicle, or may be arranged on the vehicle.

Referring to FIG. 4, the apparatus 400 may include one or more of the following components: a processing component 402, a memory 404, a power component 406, a multimedia component 408, an audio component 410, an input/output (I/O) interface 412, a sensor component 414 and a communication component 416.

The processing component 402 may be configured to control overall operations of the apparatus 400, such as the operations associated with display, data communications, camera operations, and recording operations. The processing component 402 may include one or more processors 420 to execute instructions to perform all or part of the blocks in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402. The processing component 402 may perform any one or more of the Blocks 201-205. For example, it may be determined whether a vehicle has entered a deep water area, where a deep water area has a water depth which allows water to enter an engine or causes the engine to be susceptible to water inflow; and disabling an engine start-stop function when it is determined that the vehicle has entered a deep water area.

The memory 404 may be configured to store various types of data to support the operation of the apparatus 400. Examples of such data may include instructions for any applications or methods operated on the apparatus 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk. For example, the memory 404 may be configured to store the preset duration threshold, the preset number threshold, etc.

The power component 406 may provide power to various components of the apparatus 400. The power component 406 may include a power management system, one or more power sources, and any other components associated with the generation, management and distribution of power in the apparatus 400. For example, the power component 406 may be configured to provide power to the processing component 402.

The multimedia component 408 may include a screen providing an output interface between the apparatus 400 and the user. In some examples, the screen may include a liquid crystal display (LCD) and/or a touch panel (TP). If the screen includes the touch panel, the screen may be implemented as a touch screen to receive input signals from the user. The touch panel may include one or more touch sensors to sense touches, slips, and gestures on the touch panel. The touch sensors may not only sense a boundary of a touch or swipe action, but also sense a period of time and a pressure associated with the touch or swipe action. For example, the multimedia component 408 may be configured to receive control instructions of the user so that the user may control to enable or disable the engine start-stop function, or may be configured to display, to the user, which sensors encounter water immersion, so as to determine whether to enable or disable the engine start-stop function by human intervention.

In some examples, the multimedia component 408 may include a front camera and/or a rear camera. The front camera and/or the rear camera may receive an external multimedia datum while the apparatus 400 is in an operation mode, such as a photographing mode or a video mode. Each of the front camera and the rear camera may be a fixed optical lens system or have focus and optical zoom capability.

The audio component 410 may be configured to output and/or input audio signals. For example, the audio component 410 may include a microphone (MIC). The microphone may be configured to receive an external audio signal when the apparatus 400 is in an operation mode, such as a recording mode and a voice recognition mode. The received audio signal may be further stored in the memory 404 or transmitted via the communication component 416. In some examples, the audio component 410 may further include a speaker configured to output audio signals. For example, the audio component 410 may be configured to display by way of audio frequency, to the user, an alarm signal sent by the sensor in case of water immersion.

The I/O interface 412 may provide an interface between the processing component 402 and peripheral interface modules, such as a keyboard, a click wheel, buttons, and the like. These buttons may include, but are not limited to, a home button, a volume button, a starting button, and a locking button.

The sensor component 414 may include one or more sensors to provide status assessments of various aspects of the apparatus 400. For instance, the sensor component 414 may detect an open/closed status of the apparatus 400, relative positioning of components, e.g., the component may be the display and the keypad of the apparatus 400. The sensor component 414 also may detect the position change of the apparatus 400 or of a component thereof, the presence or absence of users' touch on the apparatus 400, the direction or acceleration/deceleration of the apparatus 400, and temperature variation of the apparatus 400. The sensor component 414 may include a proximity sensor configured to detect the presence of a nearby object without any physical contact. The sensor component 414 may also include a light sensor, such as a CMOS or CCD image sensor, for use in imaging applications. In some examples, the sensor component 414 may also include an accelerometer sensor, a gyroscope sensor, a magnetic sensor, a pressure sensor, or a temperature sensor. For example, the sensor component 414 may include a water detection sensor that is configured to detect water. The sensor component 414 may be any type of water detection sensor, such as a water immersion sensor or a photoelectric water immersion sensor.

The communication component 416 may be configured to facilitate communication, wired or wirelessly, between the apparatus 400 and other devices. The apparatus 400 may access a wireless network based on a communication standard, such as Internet of Vehicles, WiFi, 2G/3G, or a combination thereof. In an example, the communication component 416 may receive a broadcast signal or broadcast associated information from an external broadcast management system via a broadcast channel. In one example, the communication component 416 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the apparatus 400 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus 400 may use the circuitries in combination with the other hardware or software components for executing the method above. Each module, sub-module, unit, or sub-unit disclosed above may be implemented at least partially using the one or more circuitries.

In examples, there is also provided a non-transitory computer readable storage medium with instructions stored therein, such as the memory 404 with instructions stored therein, where the instructions may be executable by the processor 420 in the apparatus 400, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium is also provided, where instructions stored in the storage medium may be executed by the processor 420 of the apparatus 400 so that the apparatus 400 may execute a method of controlling engine, and the method may include:

determining whether a vehicle has entered a deep water area, where a deep water area has a water depth which allows water to enter an engine or causes the engine to be susceptible to water inflow; and disabling an engine start-stop function when it is determined that the vehicle has entered a deep water area.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

With regard to the apparatus in the foregoing examples, concrete manners for executing operations by modules thereof have been described in detail in the examples related to the method, and thus are not elaborated herein.

What is claimed is:

1. A method of controlling engine, comprising:
    determining, by a processor, whether a vehicle has entered a deep water area according to a detection result of a plurality of water detection sensors, wherein the deep water area has a water depth which allows water to enter an engine of the vehicle or causes the engine of the vehicle to be susceptible to water inflow; and
    disabling, by the processor, an engine start-stop function of the vehicle when determining that the vehicle has entered the deep water area and the engine start-stop function is currently enabled,
    wherein the plurality of water detection sensors are arranged at different preset positions of the vehicle;
    wherein each water detection sensor independently generates a signal only when a water immersion height of a probe of the each water detection sensor exceeds a threshold; and
    wherein determining whether the vehicle has entered the deep water area according to the detection result of the plurality of water detection sensors comprises:
        evaluating, by the processor, a number of water detection sensors generating alarm signals; and
        determining, by the processor, that the vehicle has entered the deep water area when the number of the water detection sensors generating signals is greater than or equal to a preset number threshold.

2. The method according to claim 1, wherein determining whether the vehicle has entered the deep water area according to the detection result of the plurality of water detection sensors comprises:
    receiving, by the processor, the signals generated by the plurality of water detection sensors;
    recording, by the processor, duration of the signals; and
    determining, by the processor, that the vehicle has entered the deep water area when the duration of the signals is greater than or equal to a preset duration threshold.

3. The method according to claim 1, further comprising:
    determining, by the processor, whether the vehicle has moved out of the deep water area after the engine start-stop function is disabled; and
    enabling, by the processor, the engine start-stop function when the processor determines that the vehicle has moved out of the deep water area.

4. The method according to claim 1, wherein the plurality of water detection sensors comprise a water immersion sensor that includes a bipolar probe insulated by air under normal circumstances.

5. The method according to claim 1, wherein the preset positions comprise at least one of an exhaust and a chassis of the vehicle.

6. The method according to claim 1, wherein the processor is an electronic controller of the vehicle.

7. An apparatus for controlling engine, comprising:
    a processor; and
    a machine-readable storage medium configured to store machine-executable instructions executable by the processor;
    wherein by executing the machine-executable instructions, the processor is configured to:
    determine whether a vehicle has entered a deep water area according to a detection result of a plurality of water detection sensors, wherein the deep water area has a water depth which allows water to enter an engine of the vehicle or causes the engine of the vehicle to be susceptible to water inflow; and
    disable an engine start-stop function of the vehicle when determining that the vehicle has entered the deep water area and the engine start-stop function is currently enabled;
    wherein the plurality of water detection sensors are arranged at different preset positions of the vehicle;
    wherein each water detection sensor independently generates a signal only when a water immersion height of a probe of the each water detection sensor exceeds a threshold; and
    wherein determining whether the vehicle has entered the deep water area according to the detection result of the plurality of water detection sensors comprises:
        evaluating, by the processor, a number of water detection sensors generating alarm signals; and
        determining, by the processor, that the vehicle has entered the deep water area when the number of the water detection sensors generating signals is greater than or equal to a preset number threshold.

8. The apparatus according to claim 7, wherein when the processor determines whether the vehicle has entered the deep water area according to the plurality of detection result of the water detection sensors, the machine-executable instructions cause the processor to:
    receive the signals generated by the plurality of water detection sensors;
    record duration of the signals; and determine that the vehicle has entered the deep water area when the duration of the signals is greater than or equal to a preset duration threshold.

9. The apparatus according to claim 7, wherein the machine-executable instructions further cause the processor to:
  determine whether the vehicle has moved out of the deep water area after the engine start-stop function is disabled; and
  enable the engine start-stop function when the processor determines that the vehicle has moved out of the deep water area.

10. The apparatus according to claim 7, wherein the plurality of water detection sensors comprise a water immersion sensor and the preset positions comprise at least one of an exhaust and a chassis of the vehicle.

11. A vehicle, comprising:
  a processor; and
  a machine-readable storage medium configured to store machine-executable instructions executable by the processor;
  wherein by executing the machine-executable instructions, the processor is configured to:
  determine whether the vehicle has entered a deep water area according to a detection result of a plurality of water detection sensors, wherein the deep water area has a water depth which allows water to enter an engine of the vehicle or causes the engine of the vehicle to be susceptible to water inflow; and
  disable an engine start-stop function of the vehicle when determining that the vehicle has entered the deep water area and the engine start-stop function is currently enabled,
  wherein the plurality of water detection sensors are arranged at different preset positions of the vehicle;
  wherein each water detection sensor independently generates a signal only when a water immersion height of a probe of the each water detection sensor exceeds a threshold; and
  wherein determining whether the vehicle has entered the deep water area according to the detection result of the plurality of water detection sensors comprises:
    evaluating, by the processor, a number of water detection sensors generating signals; and
    determining, by the processor, that the vehicle has entered the deep water area when the number of the water detection sensors generating signals is greater than or equal to a preset number threshold.

12. The vehicle according to claim 11, wherein when the processor determines that the vehicle has entered the deep water area according to the detection result of the plurality of water detection sensors, the machine-executable instructions cause the processor to:
  receive the signals generated by the plurality of water detection sensors;
  record duration of the signals; and
  determine that the vehicle has entered the deep water area when the duration of the signals is greater than or equal to a preset duration threshold.

13. The vehicle according to claim 11, wherein the machine-executable instructions further cause the processor to:
  determine whether the vehicle has moved out of the deep water area after the engine start-stop function is disabled; and
  enable the engine start-stop function when the processor determines that the vehicle has moved out of the deep water area.

* * * * *